United States Patent
Ishihara et al.

(10) Patent No.: US 6,586,555 B1
(45) Date of Patent: Jul. 1, 2003

(54) PROCESSES OF PREPARING CONDENSED POLYMERS WITH POLYCARBOXYLIC ACIDS AND POLYAMINES

(75) Inventors: Kazuaki Ishihara, Konan (JP); Hisashi Yamamoto, Nagoya (JP)

(73) Assignee: Japan Science and Technology Corporation, Saitama (JP)

( * ) Notice: Subject to any disclaimer, the term of this patent is extended or adjusted under 35 U.S.C. 154(b) by 0 days.

(21) Appl. No.: 09/936,414

(22) PCT Filed: Mar. 8, 2000

(86) PCT No.: PCT/JP00/01390

§ 371 (c)(1),
(2), (4) Date: Sep. 12, 2001

(87) PCT Pub. No.: WO00/53662

PCT Pub. Date: Sep. 14, 2000

(30) Foreign Application Priority Data

Mar. 11, 1999 (JP) ............................................. 11-065682

(51) Int. Cl.[7] ........................ C08G 73/10; C08G 69/26; C08G 69/28; C08G 69/04
(52) U.S. Cl. ...................... 528/170; 528/125; 528/126; 528/128; 528/171; 528/172; 528/173; 528/174; 528/176; 528/179; 528/183; 528/184; 528/220; 528/229; 528/310; 528/312; 528/332; 528/335; 528/336; 528/350; 528/351; 528/189; 528/353; 528/331; 528/322
(58) Field of Search ................................. 528/125, 126, 528/128, 170, 171, 172, 173, 174, 176, 179, 183, 188, 184, 220, 229, 189, 350, 351, 353, 312, 310, 335, 336, 332, 322, 331

(56) References Cited

U.S. PATENT DOCUMENTS 4,640,976 A * 2/1987 Curatolo et al. ............ 528/336
5,525,701 A * 6/1996 Tominari et al. ........... 528/199

FOREIGN PATENT DOCUMENTS

| EP | 0 608778 A2 * | 8/1994 |
| JP | 59-008728 | 1/1984 |
| JP | 62-297329 | 12/1987 |
| JP | 8-333450 | 12/1996 |

OTHER PUBLICATIONS

Kazuaki Ishihara et al., "3,4,5–Triflouorobenzeneboronic Acid as an extremely Active Amidation Catalyst", *Journal of Organic Chemistry*, 1996, pp. 4196–4197, vol. 61, No. 13.

* cited by examiner

*Primary Examiner*—P. Hampton-Hightower
(74) *Attorney, Agent, or Firm*—Venable; Robert Kinberg; Ann S. Hobbs

(57) ABSTRACT

This invention provides processes of the preparation of polyamides, polyimides, and polyamideimides, which are easy to purify after reactions, from polycarboxylic acids and polyamines in high yield without side reactions such as a change of color to black by direct polycondensation reaction with heat, especially processes of preparing aromatic polyamides (aramids), aromatic polyimides, and aromatic polyamideimides, which are difficult to synthesize in direct polycondensation reaction. Polyamides, polyimides, and polyamideimides are prepared in high yield by the polycondensation of aromatic dicarboxylic acids, aromatic tetracarboxylic acids or aromatic tricarboxylic acids and aromatic diamines, using arylboric acids such as 3,4,5-trifluorophenylboric acids as polycondensation catalysts, in a mixed solvent of pentamethylbenzene and N-methylpyrrolidinone or a mixed solvent of m-terphenyl and N-butylpyrrolidinone.

66 Claims, No Drawings

PROCESSES OF PREPARING CONDENSED POLYMERS WITH POLYCARBOXYLIC ACIDS AND POLYAMINES

TECHNICAL FIELD

This invention relates to processes of preparing condensed polymers that are polyamides, polyimides, or polyamidimides and more specifically, it relates to processes of preparing condensed polymers that are polyamides, polyimides, or polyamidimides by reacting mixtures of polyamines and polycarboxylic acids or the like in solvents by using arylboric acids as polycondensation catalysts; processes of preparing condensed polymers that are polyamides, polyimides, or polyamidimides by reacting mixtures of polyamines and polycarboxylic acids or the like by using pentamethylbenzene as a solvent in the presence of polycondensation catalysts; and processes of preparing condensed polymers that are polyamides, polyimides, or polyamidimides by reacting mixtures of polyamines and polycarboxylic acids or the like by using m-terphenyl as a solvent in the presence of polycondensation catalysts.

BACKGROUND OF THE INVENTION

Polyamides, with amide bonds in their principal chain, are used as fiber materials in great quantity due to their excellent frictional resistance, elasticity, chemical resistance, and dyeability. Further, they are used not only for parts of various machines and electronics, but also for films due to their excellent mechanical, abrasion-resistant, thermo-tolerant and oilproof properties, and their low coefficient of friction. Polyimides, with imide bonds in their principal chain, are one of most heat-resistant plastics, and are used for those parts of products on which high reliability is required such as airplanes, transportation, machines, and electric or electronic machines. Polyamideimides, with amide and imide bonds in their chain, are used for various molded materials.and insulating varnish because these are excellent in workabilities and abrasion resistance. The following several processes have been proposed to prepare these polyamides, polyimides, and polyamideimides.

In Japanese Laid-Open Patent Publication No. 49-106597, there is disclosed a process of preparing a macromolecular aromatic polyamide by thermal polycondensation of an aromatic diamine and an aromatic dicarboxylic acid diester, or an aromatic aminocarboxylic ester without solvent by using at least one compound of silicon, germanium, tin or lead as a polycondensation catalyst.

In Japanese Laid-Open Patent Publication No. 59-8728, there is disclosed a process of preparing an aromatic polyamide by thermal polycondensation of an aromatic aminocarboxylic acid and/or a mixture of aromatic dicarboxylic acid and an aromatic diamine in a polar solvent in the presence of a dehydration catalyst at a temperature of about 160° C. or over.

In Japanese Laid-Open Patent Publication No. 61-14219, there is disclosed a stable process of preparing a polyamide and/or a polyamide acid which can be easily polycondensed, by using a sulfolane containing substantially no sulfolene and/or isopropylsulfolanylether as a solvent in the process of preparing a polyamide and/or polyamide acid by reacting one or more polyvalent carboxylic acids and one or more diisocyanates in the presence of one or more catalysts selected from alkali metal hydroxides, alkali metal carbonates, and alkali metal hydrogencarbonates.

In Japanese Laid-Open Patent Publication No. 8-333450, there is disclosed a process for preparing a polyimide which is stable in dimension with little residual solvent, by thermally and chemically imidising a polyimide precursor which is produced by reacting in a mixed solvent of two or more solvents selected from water soluble ether compounds, water soluble alcohol compounds, water soluble amid compounds, water soluble ketona compounds, and water, a specific aromatic diamine compound and a tetracarboxylic acid dianhydride.

In Japanese Laid-Open Patent Publication No. 8-302015, there is disclosed a polymide with a specific molecular weight and a specific structural unit, which dissolves in organic solvents having a wide range of boiling points with high solvency, is excellent in molding workabilities, and has excellent thermal resistance in spite of its softening temperature, and is useful for varnish, modling products and the like.

In Japanese Laid-Open Patent Publication No. 8-239470, there is disclosed a process of preparing a water- and oil-repellent and heat-stable polyimide resin with low surface free energy and high glass transmission temperature by reacting a specific aromatic diamine and a specific aromatic tetracarboxylic acid dianhydride.

In Japanese Laid-Open Patent Publication No. 57-133126, there is disclosed a process for preparing a polyamideimide by polycondensing a tribasic acid anhydride and a diisocyanate compound in the presence of a tertiary amine catalyst in a sulfolane solvent.

In Japanese Laid-Open Patent Publication No. 62-297329, there is disclosed a process of preparing an aromatic polyamideimide by thermal polycondensation of an aromatic tricarboxylic acid and/or aromatic tricarboxylic acid anhydride and an aromatic diamine in the presence of a dehydration catalyst and a solvent, wherein a compound selected from the group consisting of nitrobenzene, o-nitrotoluene, and benzonitrile is used as the solvent.

The present inventors, on the other hand, reported that arylboric acids with electron-withdrawing groups such as 3,4,5-trifluorophenylboric acid and 3,5-bis(trifluoromethyl) phenylboric acid can be catalysts in amide condensation of carboxylic acids and amines. (J. Org. Chem. 61, 4196-4197, 1996)

DISCLOSURE OF THE INVENTION

An object of the present invention is to provide processes of preparing polyamides, polyimides, and polyamineimides, which are easy to purify after the reaction, and especially aromatic polyamides (aramids), aromatic polyimides, and aromatic polyamideimides, which are said to be difficult to synthesize by direct polycondensation reactions from polyvalent carboxylic acids and polyvalent amines with high yield and without side reactions such as a change in color to black.

As mentioned above, the present inventors have already reported that arylboric acids can be a catalyst in the amide condensation of carboxylic acids and amines. In the case of polycondensation reactions where arylboric acids are used as a catalyst to prepare polyamides, it is important to select an appropriate solvent in polycondensation reaction system because the polymerization will not proceed unless trimers and dimers produced by the polycondensation are dissolved in the solvent. The inventors found a process of preparing polyamides, especially aromatic polyamides (aramids), which are said to be difficult to synthesize by direct polycondensation reactions, with high yield by direct thermal polycondensation reactions by employing combinations of the arylboric acids and appropriate solvents, and completed the present invention. The inventors also found that there are no side reactions accompanying a change of color to black when the direct polycondensation reactions of aromatic polyamides are performed at 200° C. or over using pentamethylbenzene or m-terphenyl as solvents, and completed the present invention.

BEST MODES FOR CARRYING OUT THE INVENTION

Polyamides, polyimides, and polyamideimides are examples of the condensed polymers in the processes of preparing condensed polymers where polycarboxylic acids and polyamines, polycarboxylic acids, polyamines and aminocarboxylic acids, or aminocarboxylic acids are reacted in solvents in the presence of arylboric acids as polycondensation catalysts of the present invention, or where polycarboxylic acids and polyamines, polycarboxylic acids, polyamines and amiocarboxylic acids, or aminocarboxylic acids are reacted in the presence of polycondensation catalysts in pentamethylbenzene or m-terphenyl as solvents of the present invention. Examples diamines, semiaromatic polyamides-produced from aromatic dicarboxylic acids and aliphatic diamines, or aliphatic dicarboxylic acids and aromatic diamines.

The polycarboxylic acids used in the present invention can be any of those having two or more carboxyl groups within a molecule. Dicarboxylic acids includes fumaric acid, malonic acid, adipic acid, terephthalic acid, isophthalic acid, sebacic acid, dodecanedioic acid, diphenylether-4,4'-dicarboxylic acid, pyridine-2,6-dicarboxylic acid or the like. Tricarboxylic acids includes butane-1 2,4-tricarboxylic acid, cyclohexane-1,2,3-tricarboxylic acid, benzene-1,2,4-tricarboxylic acid, naphthalene-1,2,4-tricarboxylic acid or the like. Tetracarboxylic acids includes butane-1,2,3,4-tetracarboxylic acid, cyclobutane-1,2,3,4-tetracarboxylic acid, benzene-1,2,4,5-tetracarboxylic acid, 3,3',4,4'-benzophenone tetracarboxylic acid, 3,3',4,4'-diphenylether tetracarboxylic acid or the like. Normally, dicarboxylic acids, tetracarboxylic acids, and tricarboxylic acids are used to prepare polyamides, polyimides, and polyamideimides, respectively. The polycarboxylic acids can roughly be classified into aliphatic polycarboxylic acids such as fumaric acid and cyclohexane-1,2,3-tricarboxylic acid, and aromatic polycarboxylic acids such as terephthalic acid.

The polyamines used in the present invention can be any of those having two or more amino groups in a molecule. Diamines include diaminobutane, hexamethylenediamine, trimethyl hexamethylenediamine, m-xylilenediamine, p-phenylenediamine, m-phenylenediamine, toluylenediamine, 4,4'-diaminodiphenylmethane, 4,4'-diaminodiphenylether, 3,4'-diaminodiphenylether, 4,4'-diaminobiphenyl, 3,3'-dimethyl-4,4'-diaminobiphenyl, 4,4'-diaminodiphenylsulfide, 2,6-diaminonaphtalene, 4,4'-bis(p-aminophenoxy)diphenylsulfone, 4,4'bis(m-aminophenoxy) diphenylsulfone, 4,4'-bis(p-aminophenoxy) benzophenophene, 4,4'-bis(m-aminophenoxy) benzophenophene, 4,4'-bis(p-aminophenylmercapto) benzophenone, 4,4'-bis(p-aminophenylmercapto) diphenylsulfone or the like. Triamines include 4,4',4"-triaminotriphenylmethane, triamterene or the like. The polyamines can roughly be classified into aliphatic polyamines such as hexamethylenediamine, and aromatic polyamines such as p-phenylendiamine.

The aminocarboxylic acids used in the present invention can be any of those having a carboxylic group and an amino group in a molecule, and can be specifically exemplified as ω-aminoundecanoic acid, aminododecanoic acid, p-aminobenzoic acid, m-aminobenzoic acid, 6-aminonaphtalene-2-carboxylic acid, 4-(p-aminophenoxy) benzoic acid, 3-(p-aminophenoxy)benzoic acid, 4-(m-aminophenoxy)benzoic acid, 3-(m-aminophenoxy)benzoic acid or the like.

The arylboric acids used in the present invention can be any arylboric acid as long as then can act as a catalyst in polycondensing polycarboxylic acids and polyamines, polycarboxylic acids, polyamines and aminocarboxylic acids, or aminocarboxylic acids in the presence of solvents. However, it is preferable to use phenylboric acids with electron withdrawing groups at least at one of the 3,4, and 5 positions, which can be specifically exemplified as 3,4,5-trifluorophenylboric acid, 3-nitrophenylboric acid, 3,5-bis (trifluoromethyl)phenylboric acid, 3,5-bis(trifluoromethyl) phenylboric acid, and 4-trifluoromethylphenylboric acid. Among these, 3,4,5-trifluorophenylboric acid is the most desirable one in view of yield. Electron withdrawing groups can be exemplified as $-CF_3$, $-F$, $-NO_2$, $-CN$, $-^+NH_3$, $-CHO$, $-COCH_3$, $-CO_2C_2H_5$, $-CO_2H$, $-SO_2CH_3$, $-SO_3H$ and the like. The arylboric acids used as polycondensation catalysts in the present invention are particularly advantageous in commercial working because they are stable, and can be easily retrieved.

As a polycondensation catalyst in the process of preparing condensed polymers by reacting polycarboxylic acids and polyamines, polycarboxylic acids, polyamines and aminocarboxylic acids, or aminocarboxylic amines in the presence of polycondensation catalysts by using pentamethylbenzene as a solvent in the present invention, it can be any of those capable of catalyzing polycondensation reaction of those starting materials in the presence of solvents containing pentamethylbenzene. As a polycondensation catalyst in the process of preparing condensed polymers in reacting polycarboxylic acids and polyamines, polycarboxylic acids, polyamines and aminocarboxylic acids, or aminocarboxylic acids in the presence of polycondensation catalysts by using m-terphenyl as a solvent in the present invention, it can be any of those usable as a catalyst in polycondensing those starting materials in the presence of solvents containing m-terphenyl. Apart from arylboric acids such as 3,4,5-trifluorophenylboric acid mentioned above, various boron compounds, phosphorus compounds, and heteropolyacids can be used as well.

Phosphorus compounds can be exemplified as phosphites such as trimethyl phosphite, triethyl phosphite, tributyl phosphite, triphenyl phosphite, tricresyl phosphite, tricyclohexyl phosphite, diethyl phosphite, diphenyl phosphite, and o-methyl-s,s'-diphenyl dithiophosphite; phosphates such as tributyl phosphate, triphenyl phosphate, ethylphenyl phosphate, and ethylenephenyl phosphate; phosphoric acids such as phosphoric acid, pyrophosphoric acid, methaphosphoric acid, tetrapolyphosphoric acid, trimethaphosphoric acid, and ethylmetaphosphoric acid; phosphonic acids such as phenylphosphonic acid; phosphines such as triphenyl phosphine and trioctyl phosphine; phosphine oxides such as triphenylphosphine oxide, and 1-phenylphospholine-3-oxide; and other compounds such as phosphorus pentoxide, ammonium dihydrogenphosphate, p-diethyltrimethylsilylphosphate, N,N',N"-hexamethylphosphorus triamide, tetrabutylpyrophosphite, phenylphonus acid, tetrakis-(2,4-ditertiarybutylphenyl)-4,4'-biphenylene diphosphonite, distearyl pentaerythritol diphosphite.

As for a solvent in the process of preparing condensed polymers by reacting polycarboxylic acids and polyamines, polycarboxylic acids, polyamines and aminocarboxylic acids, or aminocarboxylic acids, using arylboric acids as polycondensation catalysts in the present invention in the presence of solvents, it can be exemplified as pentamethylbenzene, m-terphenyl, xylene, cresol, toluene, benzene, ethylbenzene, 1,3,5-triisopropylbenzene, o-dichlorobenzene, 1,2,4-trichlorobenzene, cyclohexane, cyclopentane, phenol, naphthalene, 1,2,3,4-tetrahydronaphthalene (tetralin), acetophenone, benzophenone, diphenylsulfone, N-methylpyrrolidinone (N-methylpyrrolidone), N-butylpyrrolidinone (N-butylpyrrolidone), N-ethylpyrrolidone, N-methyl-2-pyrrolidone, 1,3-dimethyl-2-pyrrolidone, N,N-dimethylformamide, dimethylacetoamide, hexamethylphosphoramide, dimethylsulfoxide, nitromethane, acetonitrile, pyridine, 1,3-dimethyl-2-imidazolidinone, Y-butylolactone.

Among these solvents, in polycondenseing aromatic polycarboxylic acids and aromatic polyamines, it is desirable to use pentamethylbenzene or m-terphenyl, or more preferably, a mixed solvent of pentamethylbenzene and N-methylpyrrolidinone having a weight ratio of 70:30–90:10 or a mixed solvent of m-terphenyl and N-butylpyrrolidinone having a weight ratio of 3:1–10:1.

As a solvent used in the polycondensation of aliphatic dicarboxylic acids such as adipic acid and aliphatic diamines such as hexamethylendiamine, it is preferable to use a solvent containing o-xylene. Further, it is preferable to add m-cresol to o-xylene to effectively dissolve aliphatic amides such as nylon 6,6 prepared by the polycondensation and to proceed the reaction more sufficiently. The desirable amount of the m-cresol added is 10–30 wt %, that is, it is desirable to use a 70:30–90:10 mixed solvent of o-xylene and m-cresol, especially a mixed solvent having a volume ratio of 4:1. In the case where the amount of the m-cresol added is too much, the catalytic activity may be hampered. Further, it was also found that a desirable result was obtained when pentamethylbenzene or m-terphenyl was used instead of o-xylene. As is the case of o-xylene, when using pentamethylbenzene or m-terphenyl, it is desirable to use a mixed solvent of pentamethylbenzene and m-cresol having a weight ratio of 70:30–90:10, or a mixed solvent of m-terphenyl and m-cresol having a weight ration of 70:30–90:10.

As a solvent containing pentamethylbenzene or m-terphenyl in the present invention, the solvents containing pentamethylbenzene or m-terphenyl are used in the process of preparing polyconsdensation products by reacting polycarboxylic acids and polyamines, polycarboxylic acids, polyamines and aminocarboxylic acids, or aminocarboxylic acids in the presence of polycondensation catalysts using pentamethylbenzene or m-terphenyl as a solvent. In the case where 1,3,5-triisopropylbenzene, 1,2,4-trichlorobenzene, tetralin, cresol or the like is used as solvents, the color of the reaction system turns to black. However, it will not turn to black even when it is heated up to 200° C. by using pentamethylbenzene, and up to 300° C. by using m-terphenyl, and the change of color will be prevented. The change of color may be attributed to some side reactions due to the fact that it also occurs in the reaction conducted under a deoxidized atmosphere.

In the case where aromatic polyamides or the like are prepared as a condensed polymer by polycondensation, it is preferable to add N-methylpyrrolidinone (NMP) to pentamethylbenzene to efficiently dissolve the product obtained by the reaction and to sufficiently proceed the polycondensation reaction. The amount of the N-methylpyrrolidinone added is preferably 10–30 wt %, that is, it is preferable to use a mixed solvent of pentamethylbenzene and N-methylpyrrolidinone having a weight ratio of 70:30–90:10, and more preferably, a 4:1 mixed solvent of them. In the case where the amount of the N-methylpyrrolidinone added is too much, the catalytic activity maybe hampered. Further, in the case where aromatic polyamides are produced as condensed polymers by polycondensation, it is preferable to add N-butylpyrrolidinone (NBP) to m-terphenyl to effectively dissolve the product obtained by the reaction and to sufficiently proceed the polycondensation reaction. The desirable amount of the N-butylpyrrolidinone added is 9–25 wt %, that is, it is desirable to use a mixed solvent of m-terphenyl and N-butylpyrrolidinone having a weight ratio 3:1–10:1, and more desirably, a 10:1 mixed solvent of them. In the case where the amount of the N-methylpyrrolidinone added is too much, the catalytic activity may be hampered. Further, when aromatic dicaroxylic acids and aromatic diamines as starting materials are large in molecular weights, the reaction becomes effective by adding more solvent without changing the ratio of a mixed solvent.

On the other hand, in the case where aliphatic polyamides etc. are produced by polycondensation, it is desirable to add m-cresol to pentamethylbenzene or m-terphenyl to dissolve the product obtained by the reaction effectively and to proceed the reaction more sufficiently. The amount of the m-cresol added is preferably 10–30 wt %, that is, it is preferable to use a mixed solvent of pentamethylbenzene or m-terphenyl and m-cresol having a volume ratio of 70:30–90:10, and more preferably, a 4:1 mixed solvent of them. In the case where the amount of the m-cresol added is too much, the catalytic activity may be hampered. Further, when the aromatic polycaroxylic acids and aromatic polyamines as starting materials are large in molecular weights, the reaction becomes effective by adding more solvent without changing the ratio of a mixed solvent.

It is preferable to conduct the polycondensation in a process of preparing condensed products in the present invention under a deoxidized atmosphere or an argon atmosphere. The deoxidized atmosphere can be achieved by conducting the reaction in the presence of an inert gas. In an argon atmosphere, it is preferable to conduct the polycondensation reaction under argon flow, and with this argon atmosphere in a reaction, the effects of dehydration and a deoxidized atmosphere can be achieved at the same time.

Further, in the case where aromatic polycarboxylic acids and aromatic polyamines are polycondensed in pentamethylbenzene as solvents, the reaction should preferably be conducted at 160–240° C., more preferably at 200° C., while stirring and in m-terphenyl as solvents, it should preferably be conducted at 200–300° C., more preferably at 300° C., while stirring. In the case where aliphatic polycarboxylic acids and aliphatic polyamines are polycondensed, the reaction should preferably be conducted at 140–200° C., more preferably at 150° C., while stirring. The polyamides, polyimides, and poliamideimides prepared in the processes of condensation can be purified by the previously well known processes of purification. As mentioned above, side reactions do not occur in the processes of preparation in the present invention, and therefore the products produced by the present processes can be purified more easily than those produced by the previously well known processes.

The invention will be more clearly understood with reference to the following examples. The scope of this invention, however, is not restricted in any way by the following examples: Example 1

Synthesis of Aramid

Aramid was synthesized by the polycondensation reaction indicated in reaction formula (chemical formula 1). Isophthalic acid (4 mmol, 0.665 g), p-phenylenediamine (4 mmol, 0.433 g), pentamethylbenzene (the amount obtained by subtracting the NMP amount from the amount of the total solvent 5 g in Table 1), N-methylpyrrolidinone (NMP) (the weight % against the total amount of solvent 5 g in Table 1), 3,4,5-trifluorophenylboric acid (the amount represented in mol % in Table 1) was put in a Schlenk, and were stirred at 200° C. or 170° C. (temperature of oil bath represented in Table 1) for specific time(reaction times set forth in Table 1). During the stirring, argon was continuously poured to remove the water slowly (about 20 ml/min). After the reaction, the mixture was cooled to room temperature, and crude products of powdery aramids were obtained by adding acetone 50 ml and filtering. Further, after the crude products had been heated and refluxed in methanol (50 ml) for one hour, they were cooled to room temperature and refined by filtering. The isolation yields of aramids are shown in Table 1. In the case where the amount of the catalyst was 5 mol %, and the concentration of the NMP in a solvent was 20 wt % in Table 1, the catalysts were retrieved after the polycondensation reaction. After the reaction products were filtered, the filtrate was concentrated, and the catalyst was purified by using silica gel chromatography, showing that a retrieval rate was 71%.

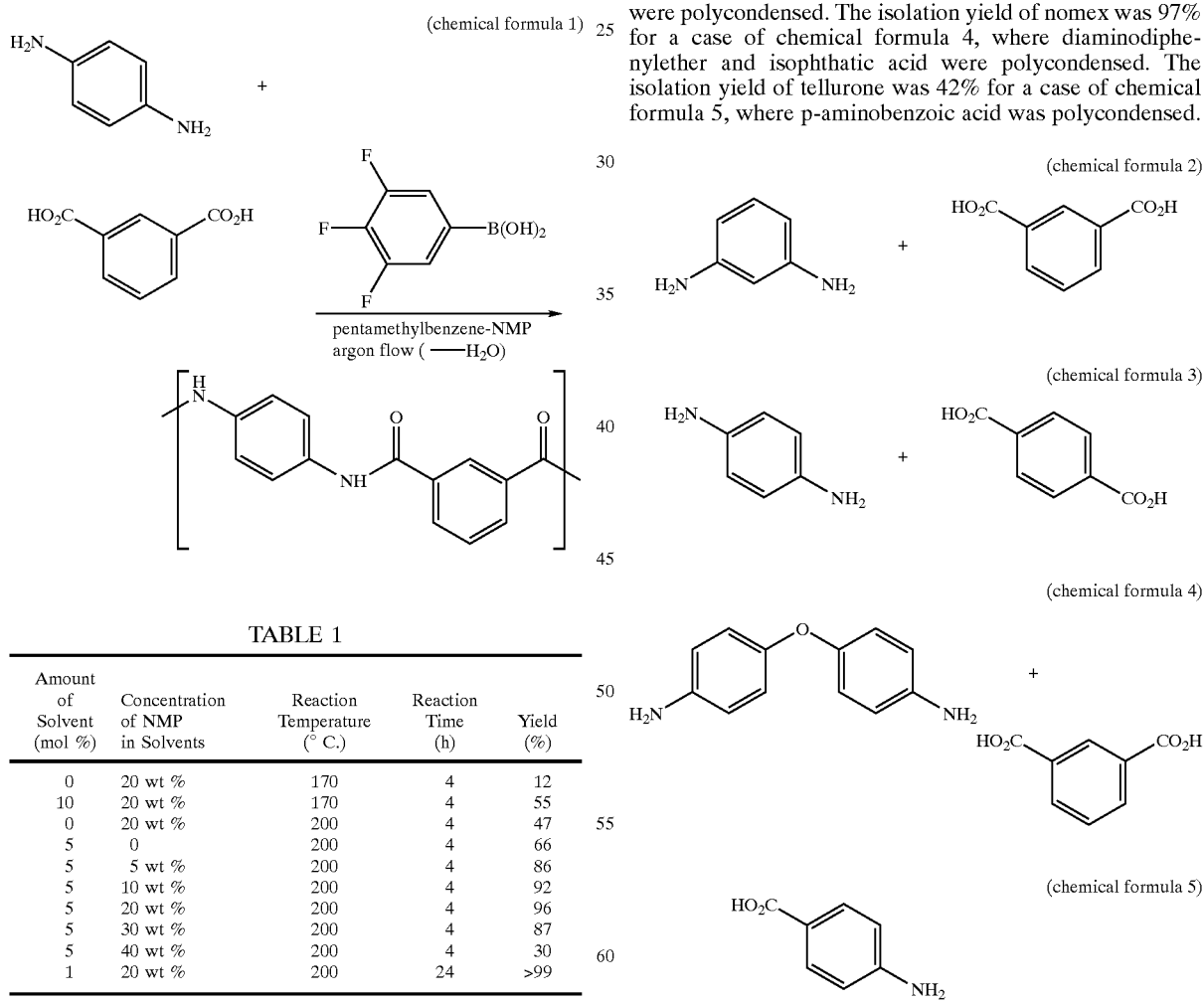

TABLE 1

| Amount of Solvent (mol %) | Concentration of NMP in Solvents | Reaction Temperature (° C.) | Reaction Time (h) | Yield (%) |
| --- | --- | --- | --- | --- |
| 0 | 20 wt % | 170 | 4 | 12 |
| 10 | 20 wt % | 170 | 4 | 55 |
| 0 | 20 wt % | 200 | 4 | 47 |
| 5 | 0 | 200 | 4 | 66 |
| 5 | 5 wt % | 200 | 4 | 86 |
| 5 | 10 wt % | 200 | 4 | 92 |
| 5 | 20 wt % | 200 | 4 | 96 |
| 5 | 30 wt % | 200 | 4 | 87 |
| 5 | 40 wt % | 200 | 4 | 30 |
| 1 | 20 wt % | 200 | 24 | >99 |

Example 2

Synthesis of Keylar

Terephthalic acid (4 mmol, 0.665 g), p-phenylenediamine (4 mmol, 0.433 g), pentamethylbenzene (4 g), N-methyl-pyrrolidinone (NMP) (1 g), and 3,4,5-trifluorophenylboric acid (0.04 mmol, 7.1 mg) were put in a Schlenk, and stirred at 200° C. (temperature of oil bath) for one day. During the stirring, argon was poured continuously to remove the water slowly. After the reaction, it was cooled to room temperature and powdery crude keylar was obtained by adding 50 ml acetone and filtering. Further, after the crude product had been heated and refluxed for one hour in methanol (50 ml), it was cooled to room temperature, and purified by filtering. The isolation yield of keylar was 99% or more (968 mg, light yellow powder).

Example 3

Synthesis of Nomex

Next, various aromatic dicarboxyic acids (4 mmol), various aromatic diamines (4 mmol), pentamethylbenzene (4 g), N-methylpyrrolidinone (NMP) (1 g), and 3,4,5-trifluorophenylboric acid (0.04 mmol) were poured into a Schlenk and stirred at 200° C. (temperature of oil bath) for one day. The other conditions were the same as in Example 2. When m-phenylenediamine and isophthalic acid were polycondensed as in chemical formula 2, the isolation yield of nomex was 99% or more. As to the isolation yield of keylar, the same result was obtained for a case of chemical formula 3, where p-phenylenediamine and terephthalic acid were polycondensed. The isolation yield of nomex was 97% for a case of chemical formula 4, where diaminodiphenylether and isophthatic acid were polycondensed. The isolation yield of tellurone was 42% for a case of chemical formula 5, where p-aminobenzoic acid was polycondensed.

Example 4

Synthesis of Aramid

Aramid was synthesized following the polycondensation reaction indicated in chemical formula 6. Isophthatic acid (1 mmol, 0.166 g), p-phenylenediamine (1 mmol, 0.108 g), m-terphenyl (the amount obtained by subtracting NBP from the amount of the total solvent 4 g in Table 2), N-butylpyrrolidinone(NBP) (the weight % against the total amount of solvent 4 g in Table 2) and 3,4,5-trifluorophenylboric acid (the amount represented in mol % in Table 2) were poured in a Schlenk, and were stirred at 300° C. (temperature of oil bath) for certain time (reaction times in Table 2). During the stirring, argon was poured continuously to remove the water slowly (about 20 ml/min). After the reaction, it was cooled to room temperature, 30 ml acetone was added and the mixture was filtered to obtain the powdery crude aramid. Further, the crude product was heated and refluxed in methanol (15 ml) for one hour, and cooled to room temperature, and purified by filtering. The treatment with methanol was repeated three times. The isolation yield of aramid is indicated in Table 2. In the case of the amount of the catalyst was 10 mol % and the NBP concentration in the solvent was 9 wt % in Table 2, the catalyst was retrieved after the polycondensation reaction. Following the filtration of the reaction product, the filtrate was concentrated, and the catalyst was purified by silica gel chromatography, showing that the retrieval rate was 71%. $\eta_{inh}$ in "a" in Table 2 indicates the result when it is measured in concentrated sulfuric acid of 0.0667 g/dl at 25° C., and "b" indicates the result of the measurement of the relative average molecular weights measured by GPC (gel permeation chromatography) by dissolving 2 wt % purified aramid in NBP containing 0.01 M LiCl and 0.05 M $H_3PO_4$ using polystyrene as a standard reference material.

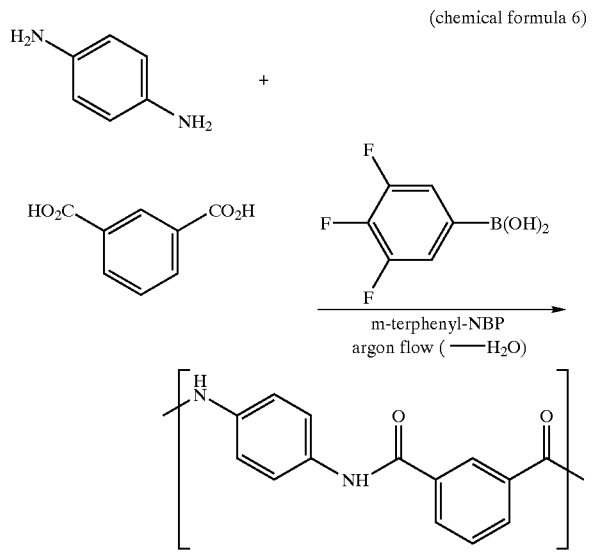

(chemical formula 6)

TABLE 2

| Amount of Solvent (mol %) | Concentration of NBP in solvents | Reaction Temperature (° C.) | Reaction Time | Yield (%) | $\eta_{inh}^{a}$ (dl/g) | $Mn^{b}/10^4$ | $Mw^{b}/10^4$ |
|---|---|---|---|---|---|---|---|
| 1 | 9 wt % | 300 | 2 days | >99 | 0.90 | — | — |
| 1 | 25 wt % | 300 | 2 days | >99 | — | 1.15 | 2.83 |
| 10 | 9 wt % | 300 | 2 h | 84 | — | — | — |
| 0 | 9 wt % | 300 | 2 h | 34 | — | — | — |

Example 5

Synthesis of Keylar

Terephthalic acid (1 mmol, 0.166 g), p-phenylenediamine (1 mmol, 0.108 g), m-terphenyl (3.33 g), N-butylpyrrolidinone (NBP) (0.67g), and 3,4,5-trifluorophenylboric acid (0.1 mmol, 17.8 mg) were poured into a Schlenk, and stirred at 300° C. (temperature of oil bath) for two days. During the period, argon was poured continuously to remove the water slowly (about 20 ml/min). After the reaction, it was cooled to room temperature, and powdery crude product of keylar was obtained by adding 30 ml acetone and filtering. Further, the crude product was heated and refluxed in methanol (15 ml), cooled to room temperature, and filtered for purification. The treatment with methanol was repeated three times. In the case of chemical formula 7, where p-phenylenediamine and terephthalic acid were polycondensed, the isolation yield of keylar was 98% (954 mg, light yellow powder). It had $\eta_{inh}$=1.19 dl/g (measured in concentrated sulfuric acid solution of 0.067 g/dl at 25° C.).

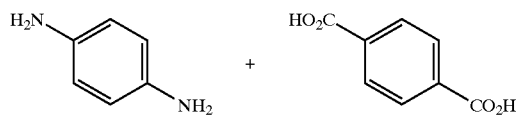

(Chemical formula 7)

Example 6

Synthesis of Aramid

Terephthalic acid (1 mmol), di(4-aminophenyl) ether (1 mmol), m-terphenyl (3.64 g), N-butylpyrrolidinone (NBP) (0.36 g), and 3,4,5-trifluorophenylboric acid (0.1 mmol) were poured into a Schlenk, and stirred at 300° C. (temperature of oil bath) for two days. The other conditions were the same as in Example 5. In the case of chemical formula 8, where the condensation polymerization of di(4-aminophenyl) ether and terephthalic acid was conducted, the isolation yield of the aramid was 98% (white powder). It had $\eta_{inh}$=0.90 dl/g (measured in concentrated sulfuric acid of 0.067 g/dl at 25° C.).

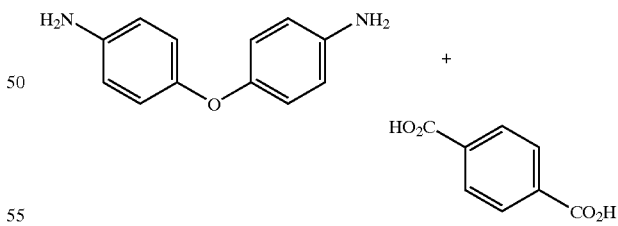

(Chemical Formula 8)

Example 7

Synthesis of Aramid

Next, various carboxylic acids (1 mmol), various aromatic amines (1 mmol), m-terphenyl (3 g), N-butylpyrrolidinone (NBP) (1 g), and 3,4,5-trifluorophenylboric acid (0.1 mmol) were poured into a Schlenk, and stirred at 300° C. (temperature of oil bath) for two days. The other conditions were the same as in Example 5. The isolation yield was 78% in the case of polycondensation of amino acids as shown in chemical formula 9. In the case of polycondensation of 1,4-diaminobenzene and 1,3-adamantanedicarboxylic acid as shown in chemical formula 10, the isolation yield of aramid was >99%, and η$_{inh}$ was 0.30 dl/g (measured in concentrated sulfuric acid solution of 0.067 g/dl at 25° C.). In the case of polycondensation of di(4-aminophenyl) ether and 1,3-adamantanedicarboxylic acid as shown in chemical formula 11, the isolation yield of aramid was 91%, and η$_{inh}$ was 0.60 dl/g (measured in concentrated sulfuric acid of 0.067 g/dl at 25° C.).

(chemical formula 9)

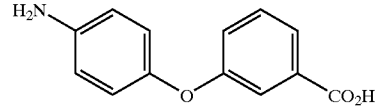

(chemical formula 10)

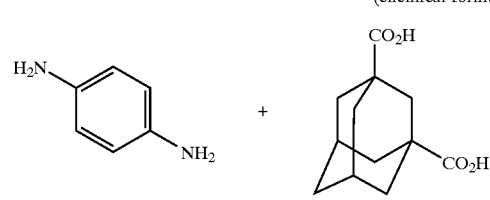

(chemical formula 11)

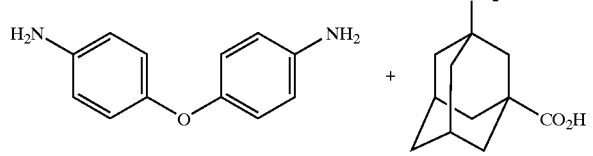

Example 8

Synthesis of Aramid

Isophthalic acid (1 mmol), di(4-aminophenyl) ether (1 mmol), m-terphenyl (3.63 g), N-butylpyrrolidinone (NBP) (0.37 g), and 3,4,5-trifluorophenylboric acid (0.01 mmol) were poured into a Schlenk, and stirred at 300° C. (temperature of oil bath) for two days. The other conditions were the same as in Example 5. In the case of polycondensation of di(4-aminophenyl) ether and isophthalic acid indicated in chemical formula 12, the isolation yield of aramid was >99%, and η$_{inh}$ was 0.60 dl/g (measured in concentrated sulfuric acid solution of 0.067 g/dl at 25° C.).

(chemical formula 12)

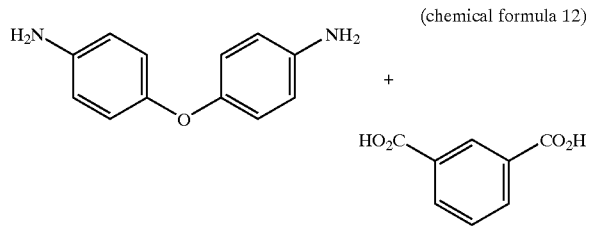

Example 9

Synthesis of Polyimide

Amines (1 mmol), carboxylic acids (1 mmol), m-terphenyl (3 g), N-butylpyrrolidinone (NBP) (1 g), and 3,4,5-trifluorophenylboric acid (0.01 mmol), as shown in chemical formula 13, were poured into a Schlenk, and stirred at 300° C. (temperature of oil bath) for two days. The other conditions are the same as in Example 5. The isolation yield of polyimide was 97%.

(chemical formula 13)

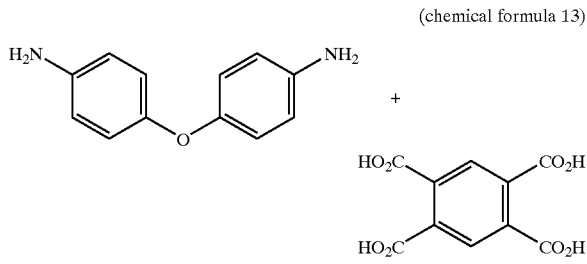

Example 10

Synthesis of Polyimide

Next, various carboxylic acids (1 mmol), various aromatic amines (1 mmol), m-terphenyl (3.63 g), N-butyl- pyrrolidinone (NBP) (0.67g), and 3,4,5-trifluorophenylboric acid (0.01 mmol) were poured into a Schlenk, stirred at 200° C. (temperature of oil bath) for one day, and then stirred at 250° C. (temperature of oil bath) for one day, and finally stirred at 300° C. (temperature of oil bath) for one day. The other conditions were the same as in Example 5. In the case of polycondensation of amines and carboxylic acids indicated in chemical formula 14, the isolation yield of polyimide was 93%. And in the case of polycondensation of amines and carboxylic acids indicated in chemical formula 15, the isolation yield of polyimide was 96%.

(chemical formula 14)

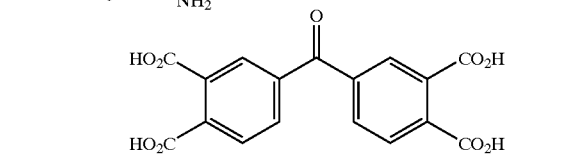

(chemical formula 15)

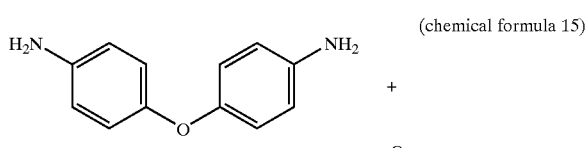

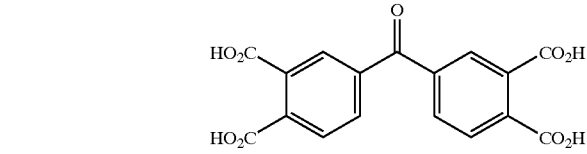

Example 11

Synthesis of Nylon 9,T

Terephthalic acid (1 mmol), 1,9-diaminononane (1 mmol), m-terphenyl (3.63 g), N-butylpyrrolidinone (NBP) (0.37 g), and 3,4,5-trifluorophenylboric acid (0.01 mmol) were poured into a Schlenk, and stirred at 200° C. (temperature of oil bath) for one day, and then stirred at 250° C. (temperature of oil bath) for one day, and finally stirred at 300° C. (temperature of oil bath) for one day. The other conditions were the same as in Example 5. In the case of polycondensation of 1,9-diaminononane and terephthalic acid indicated in chemical formula 16, the isolation yield of nylon 9,T was 94%. The molecular weight of the product measured as a 2.5 mg/ml solution of hexafluoroisopropanol (HFIP) containing 0.01 M sodium trifluoroacetate by GPC with poly(methylmethacrylate) as a standard material, was Mn=103,000 and Mw=2,292,000.

(chemical formula 16)

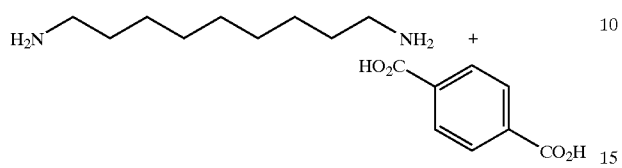

Example 12

Synthesis of Nylon 6,6

Nylon 6,6 was synthesized by the condensation polymerization reaction indicated in the reaction formula (chemical formula 17). Adipic acid (2.5 mmol), hexamethylenediamine (2.5 mmol), 3,4,5-trifluorophenylboric acid (the amount indicated in Table 2 represented in mol %), solvent (4 ml of the solvent indicated in Table 2, weight ratio of toluene to xylene was 3:1, and that of xylene to NMP was 4:1) were poured into a flask, and were heated and refluxed (the reaction temperature and time indicated in Table 2). During the reaction, a Soxhlet's extractor was connected to the top of the flask, and molecular sieve 4A was poured, and the water was removed. After the reaction, it was cooled to room temperature, and acetone (30 ml) was added to filtrate. The powdery nylon was purified by washing with water and acetone. The result is shown in Table 3.

(chemical formula 17)

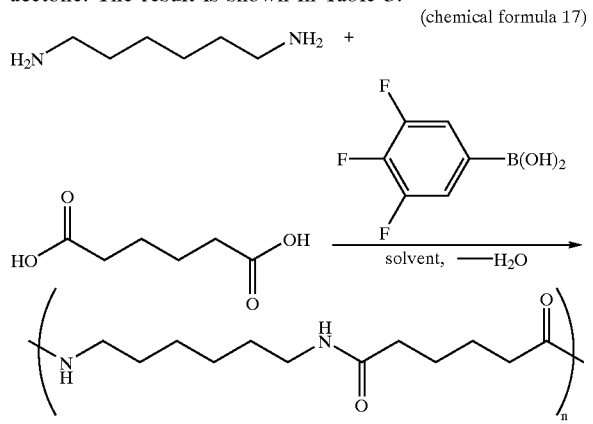

Example 13

Synthesis of Polyamide

Dicarboxylic acid derivatives of adamantane and diamine derivatives and the like were poured into a flask together with 3,4,5-trifluorophenylboric acid (1 mol %) as polycondensation catalist and mesitylene as solvent, and then heated and refluxed for twenty hours. The isolation yield of polyamide indicated in chemical formula 18 was 96%, and the isolation yield of polyamide indicated.in chemical formula 19 was 99%. It was confirmed that semiaromatic nylon 6T was prepared from terephthalic acid and hexamethylenediamine, that polyimide was prepared from benzene-1,2,4,5-tetracarboxylic acid and hexamethylendiamine, and that polyamideimide was prepared from benzene- 1,2,4-tricarboxylic acid and hexamethylendiamine with high yield for each process by the polycondensation reactions in the presence of 3,4,5-trifluorophenylboronic acid as polycondensation catalyst and hexamethylbenzene as solvent.

(Chemical formula 18)

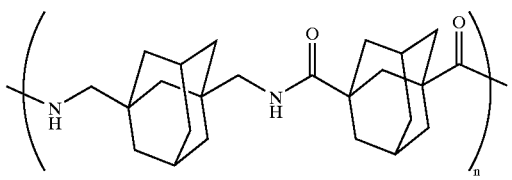

(Chemical formula 19)

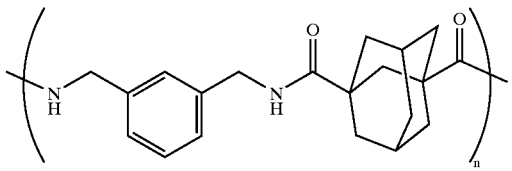

INDUSTRIAL APPLICABILITY

This invention makes it possible to produce polyamides, polyimides and polyamideimides, which are easy to purify after reaction from polycarboxylic acids and polyamines by direct thermal polycondensation with high yield and without side reactions such as a change of color to black, and

TABLE 3

| Amount of Solvent (mol %) | Solvent | Reaction Temperature (° C.) | Time (h) | Yield (%) | Mn | Mw | Mw/Mn | Mz/Mn |
|---|---|---|---|---|---|---|---|---|
| 10 | Toluene | 150 | 20 | 82 | 1010 | 2680 | 2.65 | 2.19 |
| 10 | Toluene-Cresol | 150 | 20 | 83 | | | | |
| 0 | Toluene-Cresol | 150 | 20 | 0 | | | | |
| 10 | Xylene | 150 | 20 | 89 | 2680 | 8330 | 3.11 | 2.12 |
| 10 | Xylene-Cresol | 150 | 20 | 85 | 4690 | 22400 | 4.78 | 2.02 |
| 1 | Cresol | 180 | 24 | 86 | | | | |
| 0 | Cresol | 180 | 24 | 60 | | | | |
| 1 | Xylene-NMP | 150 | 24 | 74 | | | | | especially to produce aromatic polyamides (aramids), aromatic polyimides, and aromatic polyamideimides, which are said to be difficult to prepare by direct thermal polycondensation.

What is claimed is:

1. A process of preparation of a condensed polymer by reacting a polycarboxylic acid and a polyamine, a polycarboxylic acid, a polyamine and an aminocarboxylic acid, or an aminocarboxylic acid in the presence of a polycondensation catalyst and a solvent, wherein an arylboric cid is used as the polycondensation catalyst.

2. The process as claimed in claim 1, wherein the condensed polymer is polyamyde, polyimide, or polyamideimide.

3. The process as claimed in claim 1, wherein the phenylboric acid has an electron-withdrawing group at least at one of the 3,4, and 5 positions.

4. The process as claimed in claim 3, wherein the phenylboric acid having an electron-withdrawing group at least at one of the 3,4, and 5 positions is one or more arylboric acids selected from 3,4,5-trifluorophenylboric acid, 3-nitrophenylboronic acid, 3,5-bis(trifluoromethyl) phenylboric acid, 3,5-bis(trifluoromethyl) phenylboric acid or 4-trifluoromethylphenylboric acid.

5. The process as claimed in claim 1, wherein the condensed polymer is polyamide, and the polycarboxylic acid and the polyamine, the polycarboxylic acid, the polyamine and the aminocarboxylic acid, or the aminocarboxylic acid comprises any combination of an aromatic dicarboxylic acid and an aromatic diaamine, an aromatic dicarboxylic acid and an aliphatic diamine, an aliphatic dicarboxylic acid and an aromatic diamine or an aliphatic dicarboxylic acid and an aliphatic diamine.

6. The process as claimed in claim 5, wherein an aromatic dicarboxylic acid and an aromatic diamine are used as the combination of an aromatic dicarboxylic acid and an aromatic diamine, an aromatic dicarboxylic acid and an aliphatic diamine, an aliphatic dicarboxylic acid and an aromatic diamine, or an aliphatic dicarboxylic acid and an aliphatic diamine.

7. The process as claimed in claim 6, wherein terephthalic acid and p-phenylendiamine are used as the aromatic dicarboxylic acid and the aromatic diamine.

8. The process as claimed in claim 1, wherein an aromatic tetracarboxylic acid and an aliphatic diamine are used for a combination of the polycarboxylic acid and the polyamine, the polycarboxylic acid, the polyamine and the aminocarboxylic acid, or the aminocarboxylic acid, and the condensed polymer is polyimide.

9. The process as claimed in claim 1, wherein an aromatic tricarboxylic acid and an aromatic diamine are used for a combination of the polycarboxylic acid and the polyamine, the polycarboxylic acid, the polyamine and the aminocarboxylic acid, or the aminocarboxylic acid, and the condensed polymer is polyamideimide.

10. The process as claimed in claim 1, wherein the solvent used contains pentamethylbenzene.

11. The process as claimed in claim 10, wherein a mixed solvent of pentamethylbenzene and N-methylpyrrolidinone is used as the solvent containing pentamethylbenzene.

12. The process as claimed in claim 11, wherein a mixed solvent of pentamethylbenzene and N-methylpyrrolidinone having a weight ratio of 70:30–90:10 is used as the mixed solvent of pentamethylbenzene and N-methylpyrrolidinone.

13. The process as claimed in claim 1, wherein a solvent containing m-terphenyl is used as the solvent.

14. The process as claimed in claim 13, wherein a mixed solvent of m-terphenyl and N-butylpyrrolidinone is used as the solvent containing m-terphenyl.

15. The process as claimed in claim 14, wherein a mixed solvent of m-terphenyl and N-butylpyrrolidinone having a weight ratio of 3:1–10:1 is used as the mixed solvent of m-terphenyl and N-butylpyrrolidinone.

16. The process as claimed in claim 1, wherein the reaction is performed under a deoxidized atmosphere.

17. The process as claimed in claim 1, wherein the reaction is performed under an argon atmosphere.

18. The process as claimed in claim 5, wherein an aliphatic dicarboxylic acid and an aliphatic diamine are used for the combinations of an aromatic dicarboxylic acid and an aromatic diamine, an aromatic dicarboxylic acid and analiphatic diamine, an aliphatic dicarboxylic acid and an aromatic diamine, or an aliphatic dicarboxylic acid and an aliphatic diamine.

19. The process as claimed in claim 18, wherein adipic acid and hexamethylenediamine are used as the aliphatic dicarboxylic acid and the aliphatic diamine.

20. The process as claimed in claim 18, wherein a solvent containing o-xylene is used as the solvent.

21. The process as claimed in claim 20, wherein a mixed solvent of o-xylene and m-cresol is used as the solvent containing o-xylene.

22. The process as claimed in claim 18, wherein a mixed solvent of o-xylene to m-cresol having a volume ratio of 70:30–90:10 is used as the mixed solvent of o-xylene and m-cresol.

23. The process as claimed in claim 18, wherein a mixed solvent of pentamethylbenzene and m-cresol is used as the solvent.

24. The process as claimed in claim 18, wherein the reaction is performed at 140–200° C.

25. The process as claimed in claim 18, wherein a mixed solvent of m-terphenyl and m-cresol is used as the solvent.

26. The process as claimed in claim 25, wherein the reaction is performed at 140–300° C.

27. A process of preparation of a condensed polymer by reacting a polycarboxylic acid and a polyamine, a polycarboxylic acid, a polyamine and an aminocarboxylic acid, or an aminocarboxylic acid, in the presence of a polycondensation catalyst and a solvent, wherein a solvent containing pentamethylbenzene is used as the polycondensation solvent.

28. The process as claimed in claim 27, wherein the condensed polymer is polyamide, polyimide, or polyamideimide.

29. The process as claimed in claim 27, wherein polyamide is prepared as the condensed polymer, and the polycarboxylic acid and the polyamine, the polycarboxylic acid, the polyamine and the aminocarboxylic acid, or the aminocarboxylic acid comprise any combination of an aromatic dicarboxylic acid and an aromatic diamine, an aromatic dicarboxylic acid and an aliphatic diamine, an aliphatic dicarboxylic acid and an aromatic diamine, or an aliphatic dicarboxylic acid and an aliphatic diamine.

30. The process as claimed in claim 29, wherein an aromatic dicarboxylic acid and an aromatic diamine are used as the combinations of an aromatic dicarbocylic acid and an aromatic diamine, an aromatic dicarboxylic acid and an aliphatic diamine, an aliphatic dicarboxylic acid and an aromatic diamine, or an aliphatic dicarboxylic acid and an aliphatic diamine.

31. The process as claimed in claim 30, wherein terephthalic acid and p-phenylenediamine are used as the aromaic dicarboxylic acid and the aromatic diamine.

32. The process as claimed in claim 29, wherein an aliphatic dicarboxylic acid and an aliphatic diamine are used as the combinations of an aromatic dicarboxylic acid and an aromatic diamine, an aromatic dicarboxylic acid and an aliphatic diamine, an aliphatic dicarboxylic acid and an aromatic diamine, or an aliphatic dicarboxylic acid and an aliphatic diamine.

33. The process as claimed in claim 32, wherein adipic acid and hexamethylenediamine are used as the aliphatic dicarboxylic acid and the aliphatic diamine.

34. The process as claimed in claim 27, wherein an aromatic tetracarboxylic acid and an aliphatic diamine are used as the polycarboxylic acid and the polyamine, the polycarboxylic acid and the polyamine and the aminocarboxylic acid, or the aminocarboxylic acid, and the condensed polymer is polyimide.

35. The process as claimed in claim 27, wherein an aromatic tricarboxylic acid and an aromatic diamine are used as the polycarboxylic acid and the polyamine, the polycarboxylic acid, the polyamine and the aminocarboxylic acid, or the aminocarboxylic acid and the condensed polymer is polyamideimide.

36. The process as claimed in claim 27, wherein a mixed solvent of pentamethylbenzene and N-methylpyrrolidinone is used as the solvent containing pentamethylbenzene.

37. The process as claimed in claim 36, wherein a mixed solvent of pentamethylbenzene and N-methylpyrrolidinone having a weight ratio of 70:30–90:10 is used as the mixed solvent of pentamethylbenzene and N-methylpyrrolidinone.

38. The process as claimed in claim 27, wherein a mixed solvent of pentamethylbenzene and m-cresol is used as the solvent containing pentamethylbenzene.

39. The process as claimed in claim 27, wherein an arylboric acid is used as the polycondensation catalyst.

40. The process as claimed in claim 39, wherein phenylboric acid with an electron-withdrawing group at least at one of the 3,4, and 5 positions is used as the arylboric acid.

41. The process as claimed in claim 40, wherein one or more arylboric acids selected from 3,4,5-trifluorophenylboric acid, 3-nitrophenylboric acid, 3,5-bis(trifluoromethyl)phenylboric acid, or 4-trifluoromethylphenylboric acid are used as the phenylboric acid with an electron-withdrawing group at least at one of the 3,4, and 5 positions.

42. The process as claimed in claim 27, wherein the reaction is performed under a deoxidized atmosphere.

43. The process as claimed in claim 27, wherein the reaction is performed under an argon atmosphere.

44. A polyamide compound prepared by polycondensation of an aromatic dicarboxylic acid and an aromatic diamine in the presence of an arylboric acid as a polycondensation catalyst and a mixed solvent of pentamethylbenzene and N-methylpyrrolidinone.

45. A polyimide compound prepared by polycondensation of an aromatic tetracarboxylic acid and an aromatic diamine in the presence of an arylboric acid as a polycondensation catalyst and a mixed solvent of pentamethylbenzene and N-methylpyrrolidinone.

46. A polyamideimide compound prepared by polycondensation of an aromatic tricarboxylic acid and an aromatic diamine in the presence of an arylboric acid as a polycondensation catalyst and a mixed solvent of pentamethylbenzene and N-methylpyrrolidinone.

47. A process of preparation of a condensed polymer by reacting a polycarboxylic acid and a polyamine, a polycarboxylic acid, and a polyamine and an aminocarboxylic acid, or an aminocarboxylic acid in the presence of a polycondensation catalyst and a solvent containing m-terphenyl is used as the solvent.

48. The process as claimed in claim 47, wherein polyamide, polyimide, or polyamidimide is prepared as the polycondensed polymers.

49. The process as claimed in claim 47, wherein the condensed polymer is polyamide, and the polycarboxylic acid and the polyamine, the polycarboxylic acid, and the polyamine and the aminocarboxylic acid, or the aminocarboxylic acid comprises any combination of an aromatic dicarboxylic acid and an aromatic diamine, an aromatic dicarboxylic acid and an aliphatic diamine, an aliphatic dicarboxylic acid and an aromatic diamine or an aliphatic dicarboxylic acid and an aliphatic diamine.

50. The process as claimed in claim 49, wherein an aromatic dicarboxylic acid and an aromatic diamine are used as the combination of an aromatic dicarboxylic acid and an aromatic diamine, an aromatic dicarboxylic acid and an aliphatic diamine, an aliphatic dicarboxylic acid and an aromatic diamine, or an aliphatic dicarboxylic acid and an aliphatic diamine.

51. The process as claimed in claim 50, wherein terephthalic acid and p-phenylenediamine are used as the aromatic dicarboxylic acid and the aromatic diamine.

52. The process as claimed in claim 49, wherein an aliphatic dicarboxylic acid and an aliphatic diamine are used as the combinations of an aromatic dicarboxylic acid and an aromatic diamine, an aromatic dicarboxylic acid and an aliphatic diamine, an aliphatic dicarboxylic acid and an aromatic diamine, or an aliphatic dicarboxylic acid and an aliphatic diamine.

53. The process as claimed in claim 52, wherein adipic acid and hexamethylenediamine are used as the aliphatic dicarboxylic acid and the aliphatic diamine.

54. The process as claimed in claim 47, wherein the condensed polymer is polyimide, and the polycarboxylic acid and the polyamine, the polycarboxylic acid and the polyamine and the aminocarboxylic acid or the aminocarboxylic acid comprises an aromatic tetracarboxylic acid and an aliphatic diamine.

55. The process as claimed in claim 47, wherein the condensed polymer is polyamideimide, and the polycarboxylic acid and the polyamine, the polycarboxylic acid, the polyamine and the aminocarboxylic acid or the aminocarboxylic acid comprises an aromatic tricarboxylic acid and an aromatic diamine.

56. The process as claimed in claim 47, wherein a mixed solvent of m-terphenyl and N-butylpyrrolidinone is used as the solvent containing m-terphenyl.

57. The process as claimed in claim 56, wherein a mixed solvent of m-terphenyl and N-butylpyrrolidinone having a weight ratio of 3:1–10:1 is used as the mixed solvent of m-terphenyl and N-butylpyrrolidinone.

58. The process as claimed in claim 47, wherein a mixed solvent of m-terphenyl and m-cresol is used as the solvent containing m-terphenyl.

59. The process as claimed in claim 47, wherein an arylboric acid is used as the polycondensation catalyst.

60. The process as claimed in claim 59, wherein phenylboric acid with an electron-withdrawing group at least at one of the 3,4, and 5 positions is used as the arylboric acid.

61. The process as claimed in claim 60, wherein one or more arylboric acids selected from 3,4,5-trifluorophenylboric acid, 3-nitrophenylboric acid, 3,5-bis(trifluoromethyl)phenylboric acid, 4-trifluorophenylboric acid are used as the phenylboric acid with an electron-withdrawing group at least at one of the 3,4, and 5 positions.

62. The process as claimed in claim 47, wherein the reaction is performed under a deoxidized atmosphere.

63. The process as claimed in claim 47, wherein the reaction is performed under an argon atmosphere.

64. A polyamide compound prepared by polycondensation of an aromatic dicarboxylic acid and an aromatic diamine in the presence of an arylboric acid as a polycondensation catalyst and a mixed solvent of m-terphenyl and N-butylpyrrolidinone.

65. A polyimide compound prepared by polycondensation of an aromatic tetracarboxylic acid and an aromatic diamine in the presence of an arylboric acid as a polycondensation catalyst and a mixed solvent of m-terphenyl and N-butylpyrrolidinone.

66. A polyamideimide compound prepared by polycondensation of an aromatic tricarboxylic acid and an aromatic diamine in the presence of an arylboric acid as a polycondensation catalyst and a mixed solvent of m-terphenyl and N-butylpyrrolidinone.

* * * * *